July 10, 1928.
W. COX ET AL
1,676,772
PROCESS AND APPARATUS FOR MAKING SHEET GLASS
Filed Jan. 12, 1921 2 Sheets-Sheet 2
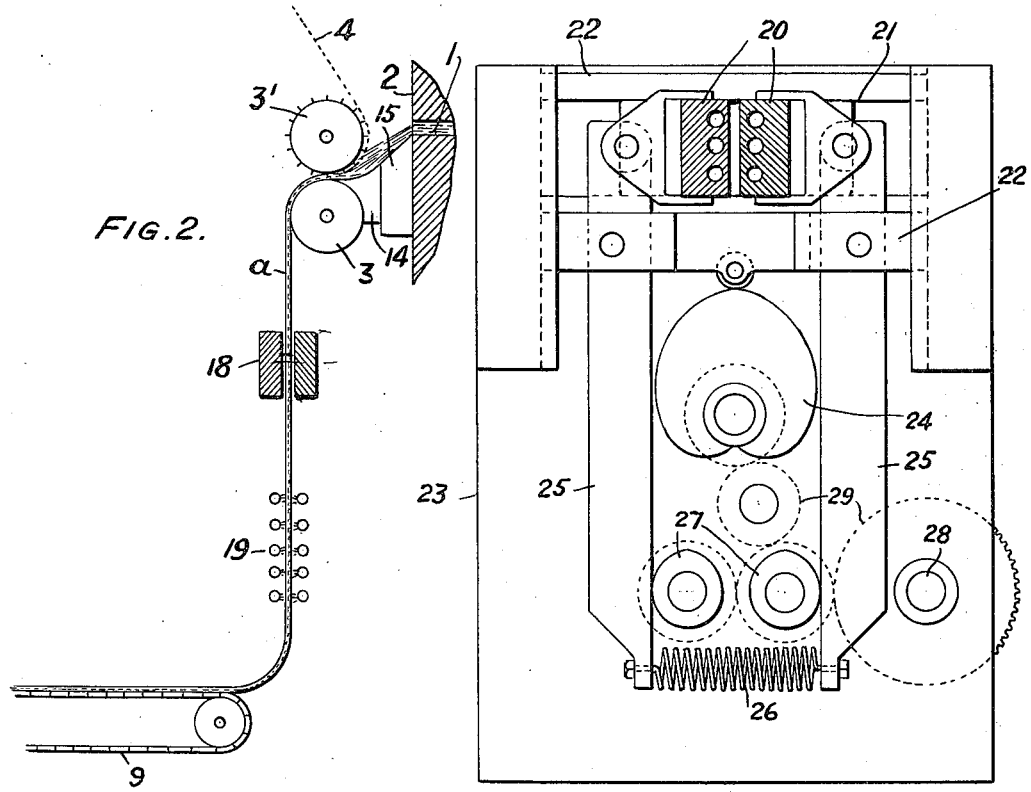
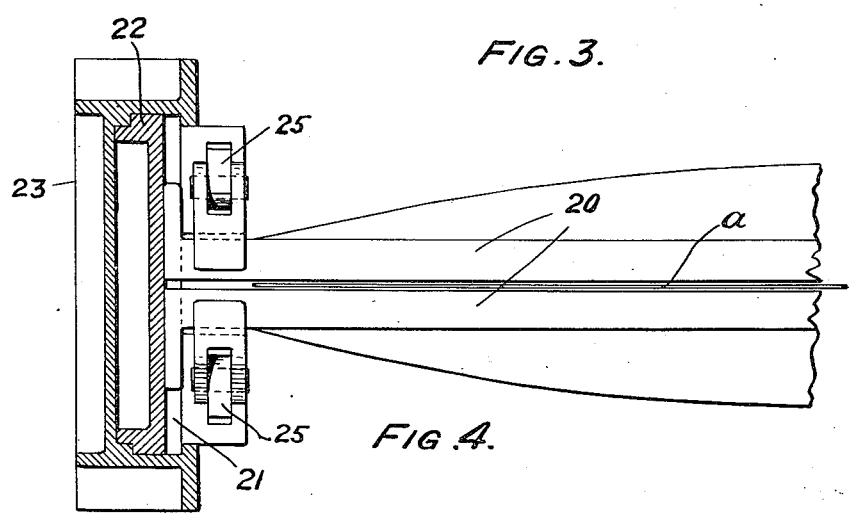
INVENTORS
Walter Cox
Arno Shuman
BY
Augustus B. Stoughton
ATTORNEY.
WITNESS:
Rob't R. Kitchel.

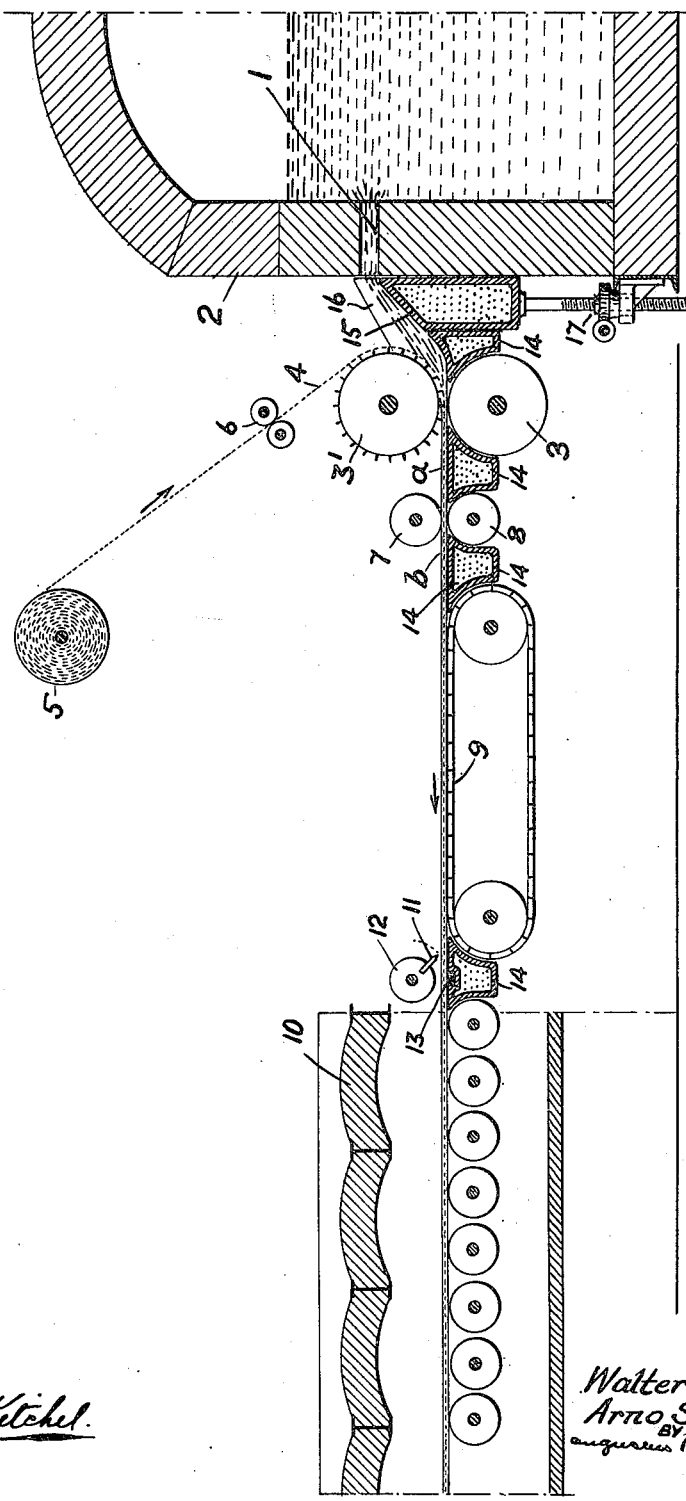

Patented July 10, 1928.

1,676,772

UNITED STATES PATENT OFFICE.

WALTER COX AND ARNO SHUMAN, OF PHILADELPHIA, PENNSYLVANIA, ASSIGNORS TO PENNSYLVANIA WIRE GLASS COMPANY, OF PHILADELPHIA, PENNSYLVANIA, A CORPORATION OF NEW JERSEY.

PROCESS AND APPARATUS FOR MAKING SHEET GLASS.

Application filed January 12, 1921. Serial No. 436,635.

The principal objects of the present invention are, first to continuously roll wire or sheet glass from glass flowing directly from the tank; second, to provide for cutting the resultant sheets into lengths, if desired; and third, to provide for making the sheets clear, like polished, in the case of wire glass and flat in the case of both plain glass and wire glass.

The invention comprises apparatus for making wire glass consisting of the combination of wire mesh embedding and smoothing rolls, a weir provided in the glass tank furnace wall—preferably below the level therein—and discharging between the mesh embedding rolls, and means for continuously supplying wire netting or mesh between the embedding rolls; with or without a rotary cutter on the delivery side of the rolls.

The invention further comprises the combination with apparatus for continuously producing a glass sheet of a press mechanism traveling with the moving sheets while pressing it and retreating against the run of the glass when not pressing it.

The invention further consists in the improvements to be presently described and finally claimed.

In the drawings

Figure 1 illustrates, principally in section, apparatus embodying features of the invention and adapted for the practice of the method of the invention.

Fig. 2, illustrates, principally in section, apparatus for practicing that part of the invention which has for its object the finishing of a continuously produced sheet, Fig. 3 is a front view, partly in section, of part of the apparatus shown in Fig. 2, and Fig. 4 is a top or plan view, partly in section.

In the drawings glass flows from a weir (collectively numbered 1) provided in the wall of a glass tank furnace 2 and shown as submerged, but the weir may be arranged nearer the glass level. The submerged arrangement possesses advantages obvious to those skilled in the art. The stream of glass flowing from the glass tank past the weir is received between mesh embedding rolls 3 and 3', which also receive between them wire mesh or netting 4, shown as delivered from the roll 5 through guide rolls 6. The projections or ribs on the roll 3' cooperating with the smooth surface of the roll 3 embed the wire netting through one face of the flowing glass and the traveling wire mesh and flowing glass are associated in rough sheet form as at $a$, and the sheet is smoothed as at $b$, by the rolls 7 and 8, of which one may be a figuring or impression roll. The sheet $b$ travels onto the conveyor 9 and into the lehr 10. 11 is a cutter blade arranged axially of the roll 12, and it, in conjunction with the block 13, serves to cut the sheet, while soft and in motion, into lengths. 14 are guides shown as water cooled and they support the glass in its passage to and from the rolls. The dam 15 of the weir is shown as provided with end walls 16 and as water cooled, and it is adapted to be raised and lowered by screw-gear 17 to control and regulate the flow of glass from the tank.

The wire glass produced as above described is not clear, because, for one reason, there are bumps upon its surface produced by the contraction of the cooling mesh, and these bumps have a lens-like action and obscure clear vision, and this is true of all continuously produced wire glass, whether made as described above or as described in our application, Serial No. 431,586, or in any other like manner. A description will now be given of our invention in its relation to the obviation of such defects and disadvantages and in relation to the continuous production of wire glass resembling or a substitute for polished wire glass. After leaving the rolls 3 and 3', the moving sheet of wire glass on its way to the conveyer 9 and lehr 10, passes through a press, collectively designated 18, in Fig. 2, which operates on the moving sheet while it is in motion and so flattens its surfaces and straightens it. If desired use may be made of a fire polishing burner 19 at the outlet side of the press. The platens or jaws 20, of the press are slidably mounted in guides 21 formed in cross-heads 22 reciprocatingly mounted in housings 23, spaced apart for the passage of the sheet between them and of which only one will be described in detail since the other is a duplicate of it. The cam 24 serves to raise and lower the cross head and with it the jaws or press plates 20, so that they travel with the moving sheet and at the same speed while pressing it and retreating against the run of the glass when not pressing, and thus all parts of the moving sheet are pressed. 25 are levers pivoted to the cross-head 22 and having one of their ends arranged to act on the jaws 20 and their other ends connected by a spring 26 which holds them up to cams 27 mounted for rotation in the housings and adapted to force the jaws together when they travel with the run of the sheet and to permit the jaws to separate when they travel against the run of the sheet. The shaft 28 extending between the housings 23, affords means for driving all the cams through gearing indicated at 29.

By omitting the wire mesh and the embedding means therefor, plain glass can be continuously produced.

That modification may be made in details and matters of form will be obvious to those skilled in the art, hence the invention is not limited as to such matters or otherwise than as the prior art and the appended claims may require.

We claim:

1. Apparatus for making wire glass comprising the combination of wire mesh embedding rolls of which one is ribbed and the other is smooth, a weir provided in the glass tank furnace wall and discharging between the embedding rolls, and means for continuously passing wire netting or mesh between the embedding rolls along with the stream of glass flowing from the tank, substantially as described.

2. Apparatus for making wire glass comprising the combination of wire mesh embedding rolls of which one is ribbed and the other is smooth, a weir provided in the glass tank furnace wall below the glass level and discharging between the embedding rolls, and means for continuously passing wire netting or mesh between the embedding rolls along with the stream of glass flowing from the tank, substantially as described.

3. Apparatus for making wire glass comprising the combination of wire mesh embedding rolls of which one is ribbed and the other is smooth, a weir provided in the glass tank furnace wall and discharging between the embedding rolls, means for continuously passing wire netting or mesh between the embedding rolls along with the stream of glass flowing from the tank, and means for adjusting the flow past the weir, substantially as described.

4. Apparatus for making wire glass comprising the combination of wire mesh embedding rolls of which one is ribbed and the other is smooth, an opening provided in the glass tank furnace wall, a movable dam for said opening over which a stream of glass continuously flows between the embedding rolls, means for continuously passing wire netting or mesh between the embedding rolls, and devices for adjusting the movable dam, substantially as described.

5. In the continuous manufacture of wire glass the improvement which consists in continuously passing the moving sheet between press platens, moving the platens synchronously with the moving sheet while pressing it, returning the platens free from and against the run of the sheet for a repetition of the described operation and reciprocating the platens to effect the described operations.

6. In the continuous manufacture of sheet glass the improvement which consists in continuously passing the moving sheet between press platens, moving the platens synchronously with the moving sheet while pressing it, returning the platens free from and against the run of the sheet for a repetition of the described operation and reciprocating the platens to effect the described operations.

7. Apparatus of the type recited comprising the combination of a cross-head reciprocable synchronously with the travel of the sheet, platens carried by the cross-head and adapted to move with and press the sheet, a cam for reciprocating the cross-head, and cams and spring-retracted levers for operating the platens, substantially as described.

8. The process of making wire glass which consists in simultaneously and continuously feeding wire mesh or netting and flowing a stream of molten glass from a glass tank on said netting or mesh, continuously embedding mesh into the stream to associate the mesh and stream in rough sheet form, and pressing the moving rough sheet to smooth it, substantially as described.

WALTER COX.
ARNO SHUMAN.